US009001944B2

(12) United States Patent
Wernaers (10) Patent No.: US 9,001,944 B2
(45) Date of Patent: Apr. 7, 2015

(54) INTER-CARRIER INTERFERENCE REDUCTION FOR MULTI-CARRIER SIGNALS

(75) Inventor: Yves Wernaers, Teralfene (BE)

(73) Assignee: ST-Ericsson SA, Plan-les-Ouates (CH)

( * ) Notice: Subject to any disclaimer, the term of this patent is extended or adjusted under 35 U.S.C. 154(b) by 1519 days.

(21) Appl. No.: 12/503,759

(22) Filed: Jul. 9, 2009

(65) Prior Publication Data

US 2010/0220822 A1 Sep. 2, 2010

(30) Foreign Application Priority Data

Jul. 15, 2008 (EP) .................................... 08160469

(51) Int. Cl.
| H03D 1/04  | (2006.01) |
| H03D 1/06  | (2006.01) |
| H03K 5/01  | (2006.01) |
| H03K 6/04  | (2006.01) |
| H04B 1/10  | (2006.01) |
| H04L 1/00  | (2006.01) |
| H04L 25/08 | (2006.01) |
| H04L 27/26 | (2006.01) |
| H04L 25/03 | (2006.01) |

(52) U.S. Cl.
CPC ...... *H04L 27/2647* (2013.01); *H04L 25/03133* (2013.01)

(58) Field of Classification Search
CPC ..................... H04L 27/2647; H04L 25/03133
USPC ......... 375/232, 233, 259, 260, 267, 295, 316, 375/340, 341, 346, 347, 348, 355, 371; 370/208, 210, 315, 329, 334, 335, 504
See application file for complete search history.

(56) References Cited

U.S. PATENT DOCUMENTS

| 2004/0091057 A1* | 5/2004 | Yoshida ........................ 375/260 |
| 2005/0129136 A1* | 6/2005 | Fujii et al. ..................... 375/260 |
| 2006/0239367 A1* | 10/2006 | Wilhelmsson et al. ....... 375/260 |
| 2008/0159420 A1* | 7/2008 | Tseng et al. .................. 375/260 |
| 2008/0219371 A1* | 9/2008 | Hong et al. ................... 375/260 |
| 2009/0180559 A1* | 7/2009 | Hsu et al. ...................... 375/260 |
| 2009/0225913 A1* | 9/2009 | Nakahara et al. ............. 375/347 |

OTHER PUBLICATIONS

European Search Report dated Jan. 13, 2009 in connection with European Patent Application No. EP 08 16 0469.
Ali Ramadan Ali, et al., "A Multistage Channel Estimation and ICI Reduction Method for OFDM Systems in Doubly Dispersive Channels", IEEE, Jan. 1, 2006, 4 pages.
Shaoping Chen, et al., "An Inter-Carrier Interference Suppression Scheme for OFDM Systems in Time-Varying Fading Channels", IEEE, May 23, 2004, 4 pages.

(Continued)

*Primary Examiner* — Syed Haider
(74) *Attorney, Agent, or Firm* — Coats & Bennett, PLLC (57) ABSTRACT

In mobile wireless communication systems the channel between the transmitter and receiver varies during a transmission. This is often referred to as fading, of which different kinds exist—each resulting in different impairments with specific properties. A low complexity scheme is described to reduce the noise created by inter-carrier interference or ICI. The method makes use of the guard interval and assumes slow variation of the channel. It is not restricted to wireless communication and can be used in any environment with varying channels.

12 Claims, 7 Drawing Sheets

(56) References Cited

OTHER PUBLICATIONS

European Search Report dated Nov. 4, 2009 in connection with European Patent Application No. EP 09 16 5586.

Communication pursuant to Article 94(3) EPC dated Jul. 30, 2010 in connection with European Patent Application No. EP 09 165 586.0.

* cited by examiner

INTER-CARRIER INTERFERENCE REDUCTION FOR MULTI-CARRIER SIGNALS

CROSS-REFERENCE TO RELATED APPLICATION(S)

The present application claims the benefit under 35U.S.C. §119(a) to a European patent application filed in the European Patent Office on Jul. 15, 2008 and assigned Serial No. 08160469.6, the entire disclosure of which is hereby incorporated by reference.

TECHNICAL FIELD

This invention relates to estimation, and optionally reduction, of inter-carrier interference in a received multi-carrier signal and to apparatus and methods for estimation, and optionally reduction, of inter-carrier interference in a received multi-carrier signal as well as to software able to perform such methods.

BACKGROUND

Multi-carrier transmission schemes such as Orthogonal Frequency Division Multiplexing (OFDM) are being deployed in, or proposed for, a wide range of communications systems such as wireless networking, radio and television broadcasting and multicasting, and Fourth Generation (4G) communications networks. In a multi-carrier transmission scheme a number of orthogonal carrier signals are used. Data to be transmitted is divided into parallel data streams, one stream for each carrier, and data symbols are formed. Each carrier is modulated using a modulation scheme such as Quadrature Amplitude Modulation (QAM) or Quadrature Phase Shift Keying (QPSK). Multi-carrier transmission schemes are popular because they are particularly robust where the channel between a transmitter and a receiver suffers from impairments such as time dispersion and/or frequency selective fading.

One problem facing multi-carrier transmission schemes is their susceptibility to frequency offsets, phase noise, and Doppler effects when the channel is rapidly changing. These problems can cause inter-carrier interference (ICI) between the multiple carriers, and can result in bit errors.

Various techniques are known to cancel inter-carrier interference but they generally require significant processing resources with complexity that is of the order of $O(N.\log_2(N))$ to $O(N^3)$, where N is the symbol length. This makes the known techniques unsuitable for use in terminals which have limited processing resources or power budgets. WO 2006/111843 describes an inter-carrier interference reduction technique which uses windowing of the received signal and then uses a matrix computation to estimate the ICI impact on each carrier by means of sequential channel estimations, after time-domain to frequency-domain processing.

SUMMARY

One object of this invention is to provide apparatus and methods for estimation, and reduction, of inter-carrier interference in a received multi-carrier signal. The present invention seeks to provide a way of estimating inter-carrier interference which requires less computational resources.

A first aspect of the present invention provides a method of estimating inter-carrier interference (ICI) for a multi-carrier signal received from a channel, in which signal symbols are separated by a guard interval containing a cyclic extension of a symbol, the method includes estimating inter-carrier interference using the function:

$$\tilde{A}(n) = \frac{rx(n) - rx(n-N)}{N}$$

for n=[N−G, N−1]
  rx(n) is the received signal at time n,
  rx(n−N) is the received signal at time n−N,
  N is the symbol length (not including the cyclic extension),
  G is the cyclic extension length;
the estimating of the inter-carrier interference being in the time-domain before time-domain-to-frequency processing of the received signal.

More preferably the estimation is made using the function:

$$ICI_{estimated}(n) = \left(n - \frac{N-1}{2}\right) \cdot \tilde{A}(n)$$

where: $ICI_{estimated}(n)$ is the estimated inter-carrier interference.

The present invention also provides a method of reducing inter-carrier interference (ICI) for a received multi-carrier signal in which symbols are separated by a guard interval containing a cyclic extension of a symbol, the method comprising:
  performing an estimation of ICI;
  using the estimation of ICI to reduce ICI in the received signal. The estimation can be calculated by:

$$rx_{ICIreduced}(n) \cong rx(n) - \left(n - \frac{N-1}{2}\right) \cdot \tilde{A}(n)$$

or $$rx_{ICIreduced}(n) \cong rx(n) - \left(n - \frac{N-1}{2}\right) \cdot W(n) \cdot \tilde{A}(n),$$

where W(n) is a windowing function.

The present invention also provides an ICI reduction stage, e.g. in a receiver, or transceiver, a controller for a receiver, or a transceiver, software for implementing any of the methods of the present invention as well as a storage medium storing the software.

This invention can be applied to wireless communication systems, but can be used in any environment with varying channels such as found in wireline systems, e.g., for use with ADSL modems. For example, temperature changes result in channel characteristics changing.

The present invention can be applied to all transmission schemes using a cyclic extension as guard interval, e.g., OFDM and DMT. The method can be applied to any communication scheme which uses guard intervals, e.g. a cyclic prefix, a cyclic postfix or combination of both.

A method according to an embodiment of the present invention can estimate ICI with a complexity of O(G), where G is guard interval length. The method is not tied to any particular modulation scheme.

A further improvement can be obtained by optimal windowing when correcting the received signal in the time-domain.

The estimation of ICI can be used to calculate the channel impulse response (CIR) length.

The functionality described here can be implemented in software, hardware or a combination of these. The invention can be implemented by means of hardware comprising several distinct elements, and by means of a suitably programmed processing apparatus. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the steps of the described methods. The software may be stored on an electronic memory device, hard disk, optical disk or other machine-readable storage medium. The software may be delivered as a computer program product on a machine-readable carrier or it may be downloaded to a terminal via a network connection.

BRIEF DESCRIPTION OF THE DRAWINGS

Embodiments of the invention will be described, by way of example only, with reference to the accompanying drawings in which.

DETAILED DESCRIPTION

The term cyclic extension as used throughout the specification and claims refers to any system that makes use of a guard interval, e.g. a cyclic prefix or a cyclic postfix or a combination of both. In any part of this specification or in the claims, reference to a cyclic prefix may be replaced by cyclic postfix or a combination of cyclic postfix and prefix.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
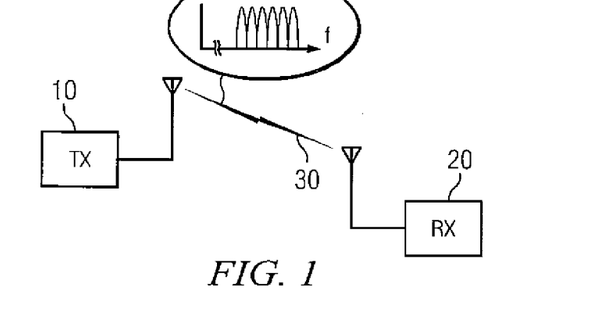
FIG. 1 shows an example communications system.

FIG. 1 shows a simple communication system with a transmitter TX 10 and a receiver RX 20 connected by a channel 30. Transmitter TX 10 and receiver RX 20 communicate using a multi-carrier transmission scheme, such as Orthogonal Frequency Division Multiplexing (OFDM). In this description a mobile wireless communication system will be used as an example of a communication system in which the invention can be implemented, but the invention is not restricted to that particular type of communication.

A fixed wireless channel 30 can be modelled as a multi-tap channel. A channel of L+1 taps can be expressed as:

$$h_a(t) = \sum_{l=0}^{L} h(l) \cdot \delta(t-l)$$

By adding mobility the taps become time-dependent:

$$h_a(t) = \sum_{l=0}^{L} h(t,l) \cdot \delta(t-l)$$

In a sampled system the mobile wireless channel becomes:

$$h(n) = h_a(n \cdot T_S) = \sum_{l=0}^{L} h(n,l) \cdot \delta(n-l)$$

In mobile wireless communication systems the channel 30 between the transmitter and receiver will usually vary during a transmission. This is often called fading, and there are different kinds of fading, each resulting in different impairments with specific properties. One such impairment is inter-carrier interference (ICI). For a varying wireless channel, the channel variation speed is related to the Doppler frequency (Fd), which is defined by:

$$Fd = \frac{v \cdot F_c}{c} \cdot \cos(\theta).$$

where $F_c$ is the carrier frequency, c is the speed of light, $\theta$ the angle of arrival.

Figure 2:
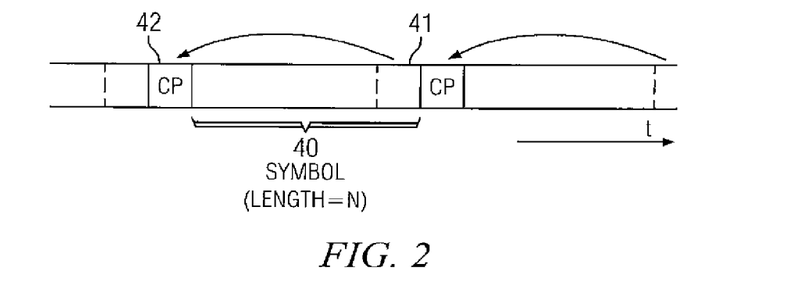
FIG. 2 shows a stream of received symbols in the time-domain.

FIG. 2 shows a stream of time-domain symbols of a multi-carrier (e.g. OFDM) signal transmitted over channel 30 between transmitter TX 10 and receiver RX 20. Each symbol 40 has a length N and has a guard interval which contains a cyclic extension, e.g. is preceded by a guard interval which contains a cyclic prefix 42 of length G. The cyclic extension, e.g. cyclic prefix 42 contains a copy of portion 41 of the symbol, e.g. a copy from the end of the symbol 40 which succeeds it. Each symbol 40 in the stream has the same form, with adjacent symbols 40 being separated by a guard interval 42.

Figure 3:
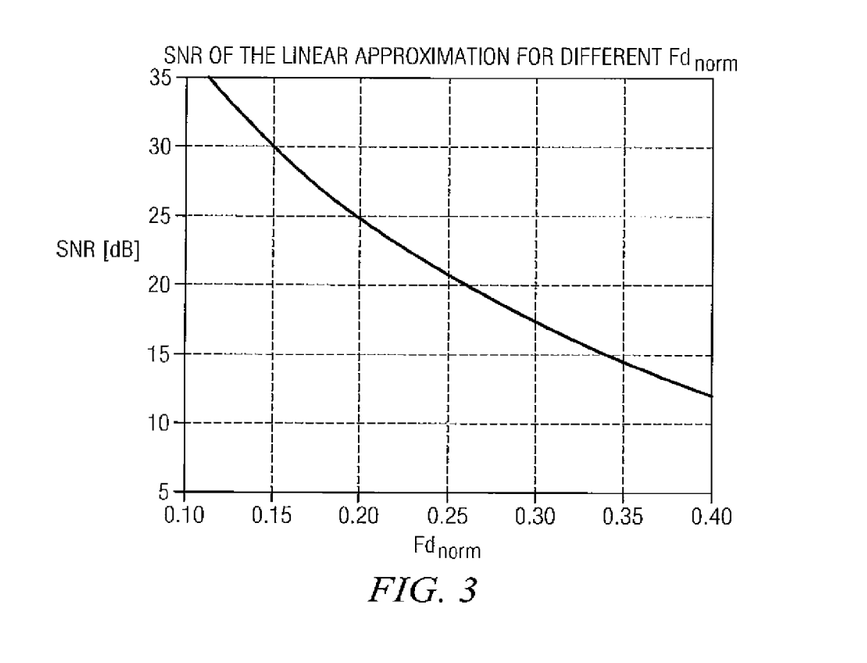
FIG. 3 shows signal-to-noises ratio (SNR) resulting from use of a linear approximation of a channel variation.
Figure 4:
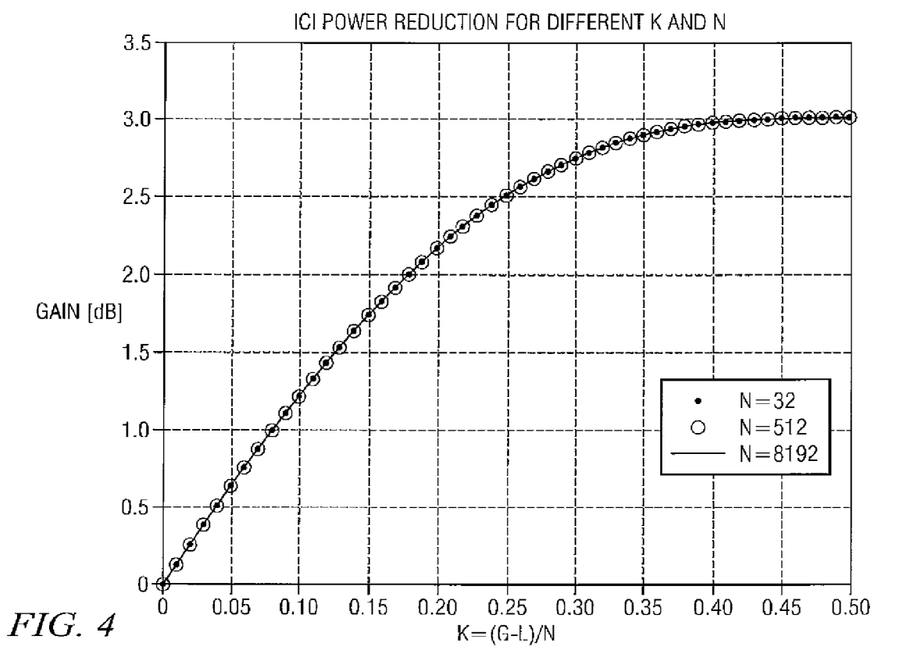
FIG. 4 shows ICI power reduction.

We will now define:
N=symbol length
G=guard interval length $$h_{av}(l) = \frac{1}{N} \cdot \sum_{n=0}^{N-1} h(n,l)$$

and this average constant during a symbol period, where
T=sample period
$T_{symb}$=symbol period=(G+N).T
$Fd_{norm}$Fd.$T_{symb}$=normalised Doppler frequency
During symbol k (n=[−G, N−1]) the channel variation can be modelled by the first order Taylor approximation:

$$h(n,l) \cong h_{av}(l) + \left(n - \frac{N-1}{2}\right) \cdot a(l) \qquad (1)$$

where a(l) is the slope of tap l during symbol k. This approximation is better for low values of $Fd_{norm}$. In general, the approximation is valid for $Fd_{norm}$<0.3, but it depends on the required accuracy. FIG. 3 shows a graph of the worst case SNR of the linear approximation for different values of $Fd_{norm}$.

Figure 11A:
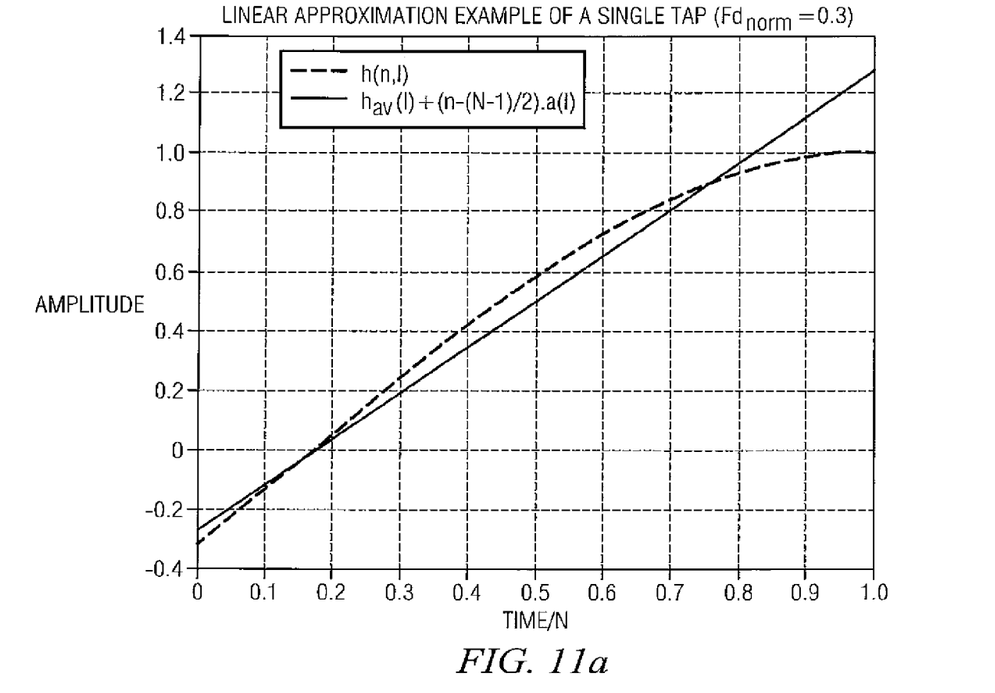
FIG. 11a shows the Taylor approximation of a single tap for low Fdnorm(=0.3)
Figure 11B:
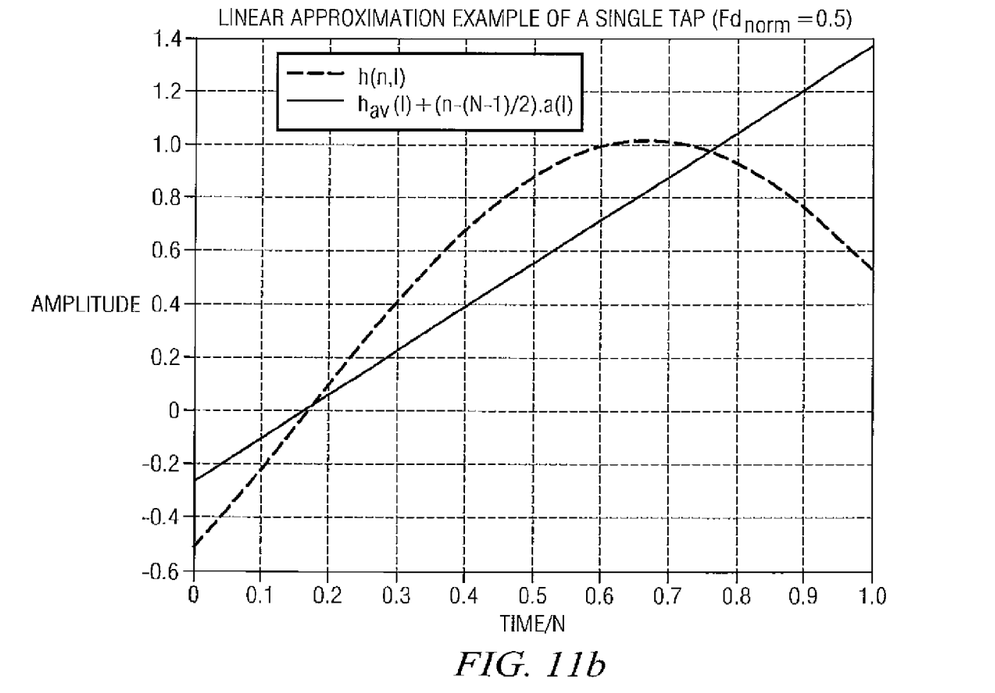
FIG. 11b shows the approximation for Fdnorm=0.5.

Taylor approximations are illustrated in FIGS. 11a and b. FIG. 11a shows the Taylor approximation of a single tap for low Fdnorm (=0.3). FIG. 11b shows the approximation for Fdnorm=0.5.

The Received Signal

All the following equations only consider reception of a single symbol, but can be extended to multiple symbols. At the receiver:

$$rx(n) = \sum_{l=0}^{L} tx(n-l) \cdot h(n,l) + w(n)$$

In this equation rx(n) is the received signal, tx(n) is the transmitted signal, h(n,l) is the channel and w(n) is the Additive White Gaussian Noise. The AWGN noise is not due to ICI. White Gaussian noise is for instance thermal noise or noise generated by the analog circuit. The frequency spectrum of AWGN is flat and the noise is uncorrelated.

For n=[−G, N−1], the equation can be expanded using results from equation (1) to:

$$rx(n) \cong \sum_{l=0}^{L} tx(n-l) \cdot h_{av}(l) + \left(n - \frac{N-1}{2}\right) \cdot \sum_{l=0}^{L} tx(n-l) \cdot a(l) + w(n)$$

The second term in the equation is related to the channel variation and results in ICI noise.
If we now define:

$$A(n) = \sum_{l=0}^{L} tx(n-l) \cdot a(l)$$

then the received signal can be expressed as:

$$rx(n) \cong \sum_{l=0}^{L} tx(n-l) \cdot h_{av}(l) + \left(n - \frac{N-1}{2}\right) \cdot A(n) + w(n) \qquad (2)$$

Assign $$ICI(n) = \left(n - \frac{N-1}{2}\right) \cdot A(n),$$

so:

$$rx(n) \cong \sum_{l=0}^{L} tx(n-l) \cdot h_{av}(l) + ICI(n) + w(n)$$

ICI noise will not always be the dominant form of noise in the received signal. If the ICI noise is not dominant, i.e. if:

$$E\{|w(n)|^2\} >> E\left\{\left|\left(n - \frac{N-1}{2}\right) \cdot A(n)\right|^2\right\}$$

with E{ }=expectation= average, then reducing ICI will not improve performance. Therefore the only cases of interest are when the ICI is a dominant noise, i.e., if:

$$E\{|w(n)|^2\} \cong E\left\{\left|\left(n - \frac{N-1}{2}\right) \cdot A(n)\right|^2\right\}$$

or $$E\{|w(n)|^2\} << E\left\{\left|\left(n - \frac{N-1}{2}\right) \cdot A(n)\right|^2\right\}$$

At this point tx(n) is unknown and rx(n) can not be correctly demodulated due to the (large) ICI term.

Estimation of A(n)

In this and the following sections, all equations are valid for n=[N−G, N−1]. Due to the cyclic extension (42 FIG. 2) in the transmission scheme, the following relationship is valid:

$$tx(n)=tx(n-N)$$

Substituting this in:

$$A(n-N) = \sum_{l=0}^{L} tx(n-N-l) \cdot a(l)$$

$$= tx(n-N) \cdot a(0) + \sum_{l=1}^{L} tx(n-N-l) \cdot a(l)$$

we finally obtain:

$$A(n-N) = A(n) + \sum_{l=1}^{L} (tx(n-N-l) - tx(n-l)) \cdot a(l)$$

Note that for n=[N−G+L, N−1]: A(n−N)=A(n)
Finally after many computation, one can obtain:

$$rx(n)-rx(n-N) \cong N \cdot A(n) - ISI(n) + w'(n)$$

with $$ISI(n) = \sum_{l=1}^{L} (tx(n-N-l) - tx(n-l)) \cdot (h(n,l) - N \cdot a(l))$$  (5)

and w'(n)=w(n)−w(n−N)
Note that for n=[N−G+L, N−1]: ISI(n)=0 and rx(n)−rx(n−N)≅N.A(n)+w'(n)
Rewriting the last equation:

$$\tilde{A}(n) = \frac{rx(n) - rx(n-N)}{N} \quad (3)$$

$$\cong A(n) - \frac{ISI(n)}{N} + \frac{w'(n)}{N}$$

Stated in words, the estimation of A(n) noise is given by first subtracting the received signal at point (n−N) from the received signal at point (n), and then dividing by the symbol length. This relationship makes use of the periodicity in the received symbol, which arises due to the presence of the cyclic extension.

When the range is reduced to n=[N−G+L, N−1] we observed that ISI(n)=0, hence the estimation of A(n) is very good. For the range n=[N−G, N−G+L−1] the estimation is biased by ISI(n) which can be significant.

As described earlier, the estimation of ICI assumes a slow variation of the channel. The two points rx(n), rx(n−N) have the same value if no ICI and no noise is present.
If no ICI is present then $$rx(n) = \sum_{l=0}^{L} tx(n-l) \cdot h_{av}(l) + w(n)$$

and $$rx(n-N) = \sum_{l=0}^{L} tx(n-N-l) \cdot h_{av}(l) + w(n-N)$$

Therefore:

$$rx(n) - rx(n-N) = \sum_{l=0}^{L} (tx(n-l) - tx(n-N-l)) \cdot h_{av}(l) + w(n) - w(n-N)$$

And due to cyclic extension:

$$rx(n) - rx(n-N) = w(n) - w(n-N) = w'(n)$$

Since the invention is preferably used when the ICI is the dominant noise and so w(n) is small, the equation results in almost zero.

Figure 12:
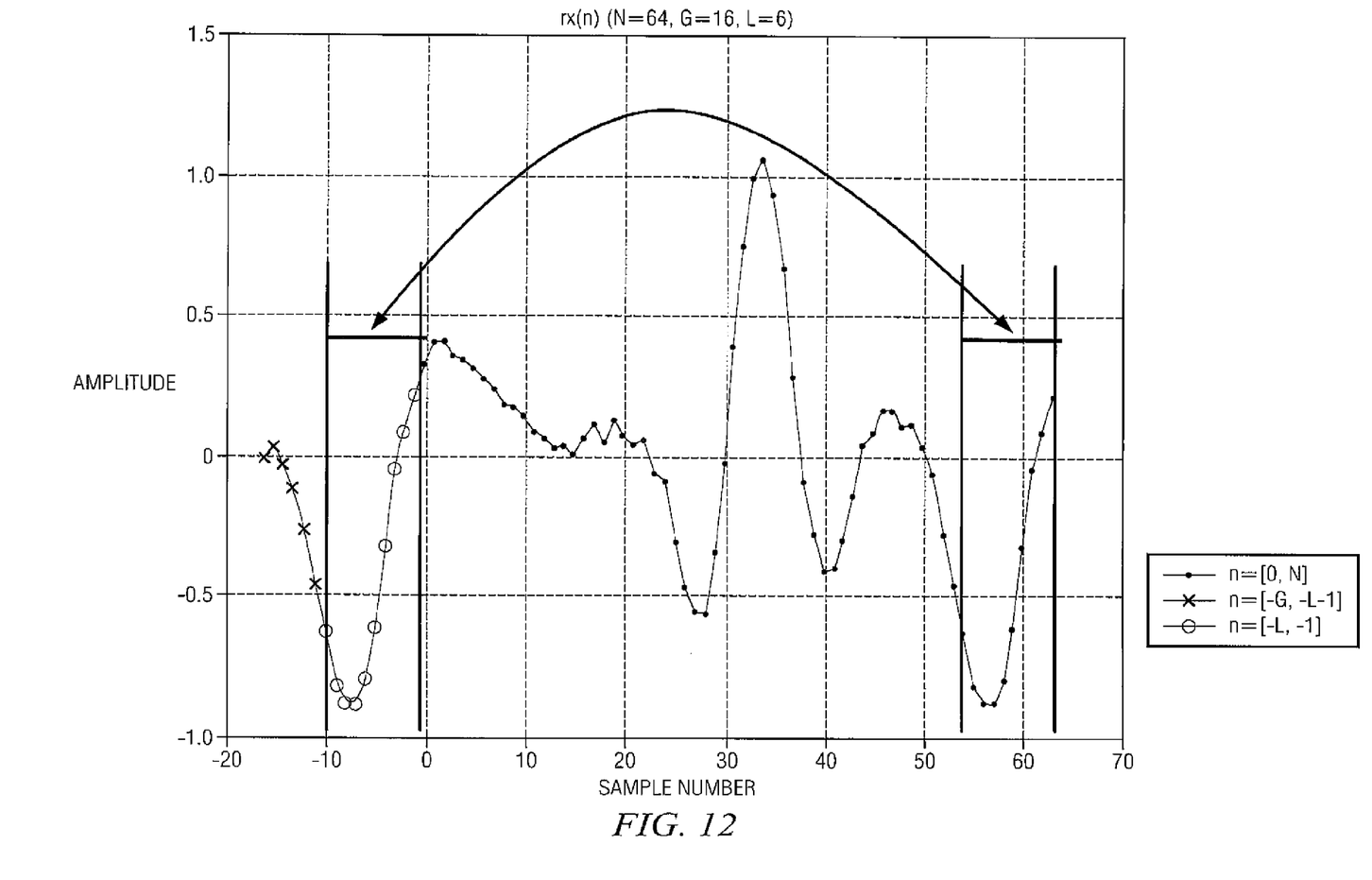
FIG. 12 shows a time domain symbol received by a receiver.

FIG. 12 shows rx(n) with no ICI present. The cyclic prefix part (i.e. cyclic extension) is the part of the curve show with + and circles, but due to the channel impulse response (L=6) only the part with circles is a perfect copy of the end of the symbol (n=[N−G+L, N−1]).

A(n) is estimated every symbol (i.e. is signal dependent). The equation to be used is (3). Once A(n) is estimated, the ICI is preferably cancelled.

Reduction of the ICI
Ideally, the received signal with no ICI impairment can be expressed as:

$$rx_{noICI}(n) = \sum_{l=0}^{L} tx(n-l) \cdot h_{av}(l) + w(n)$$

Let KIN(n) be a windowing function, not specified yet. AWGN noises w(n) and w'(n) are omitted for sake of clarity:

$$rx_{reducedICI}(n) = rx(n) - \left(n - \frac{N-1}{2}\right) \cdot \tilde{A}(n) \cdot WIN(n) \quad (4)$$

This formula assumes that:

$$ICI_{estimated}(n) = \left(n - \frac{N-1}{2}\right) \cdot \tilde{A}(n)$$

$$\cong ICI(n)$$

Expanding equation (4) using (3) finally leads to:

$$rx_{reducedICI}(n) \cong \quad (5)$$

$$rx_{noICI}(n) + \left(n - \frac{N-1}{2}\right) \cdot \left(A(n) \cdot (1 - WIN(n)) + \frac{ISI(n)}{N} \cdot WIN(n)\right)$$

Since the ISI contribution can be rather significant we choose WIN(n) as follows:

WIN(n)=1 for n=[N−G+L, N−1]

WIN(n)=0 for n=[N−G, N−G+L−1]

This results in the following:

$rx_{reducedICI}(n) \cong rx_{noICI}(n)$ for n=[N−G+L, N−1]

$rx_{reducedICI}(n) \cong rx(n)$ for n=[N−G, N−G+L−1]

Equation (5) shows how the ICI can be removed from rx(n) with a specific choice of WIN(n).

The ICI is removed from the received symbol for n=[N−G+L, N−1] for example, but the ICI power is the biggest at that position—as can be derived from equation (2). For the ICI reduction take placing in the time-domain reference is made in to block 54 of FIG. 10.

Noise Power Reduction of the Invention
It can be shown that the new ICI reduction method is not boosting the other noise power. Restating equation (4), assuming the range of n where WIN(n)=1:

$$rx_{reducedICI}(n) \cong rx(n) - \left(n - \frac{N-1}{2}\right) \cdot \frac{rx(n) - rx(n-N)}{N}$$

Expanding the formula:

$$rx_{reducedICI}(n) \cong$$

$$\sum_{l=0}^{L} tx(n-l) \cdot h_{av}(l) + \left[w(n) \cdot \frac{3 \cdot N - 2 \cdot n - 1}{2 \cdot N} + w(n-N) \cdot \frac{2 \cdot n - N + 1}{2 \cdot N}\right]$$

The second term is the noise created by the new ICI reduction method and should be compared to w(n)—see equation (2).

Figure 5:
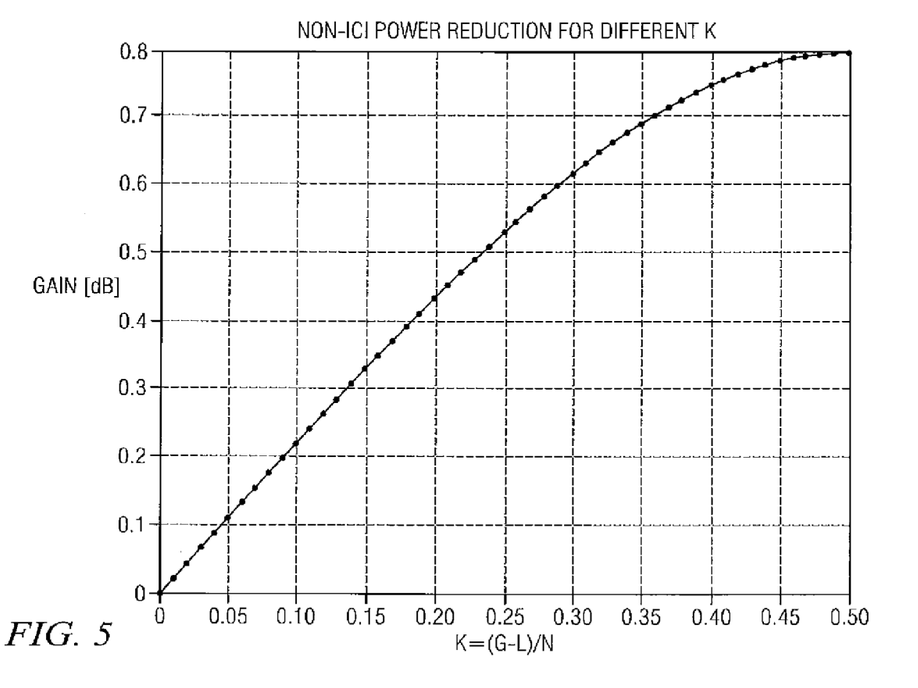
FIG. 5 shows non-ICI power reduction.

The result is shown in FIG. 5 and the conclusion is that the new ICI reduction method also has the effect of reducing the non-ICI noise and so improves even more the overall performance.

One communication system in which the ICI reduction method can be used is a Digital Video Broadcasting-Handheld (DVB-H) communication system. In DVB-H the normalised Doppler frequency Fd(3 dB) is defined as "the Doppler frequency on which the total noise has increased by 3 dB with respect to a quasi static environment". This can also be stated as "the Doppler frequency on which the ICI noise power equals the non-ICI noise power". Assume the value of K=(G−L)/N=¼.

Figure 6:
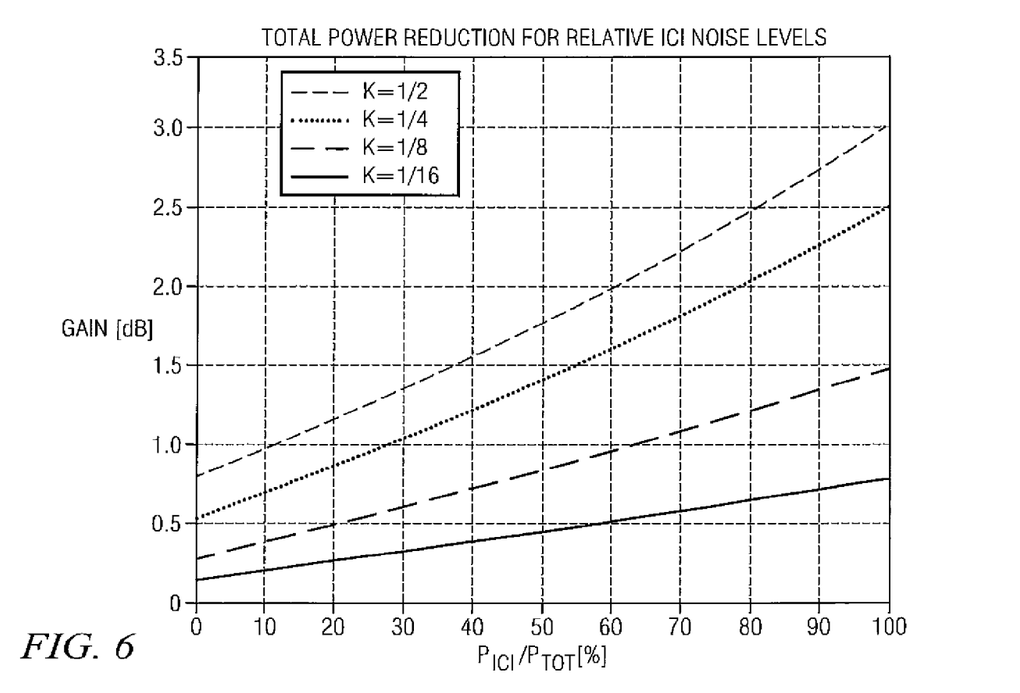
FIGS. 6 to 8 show graphs of noise power reductions.
Figure 7:
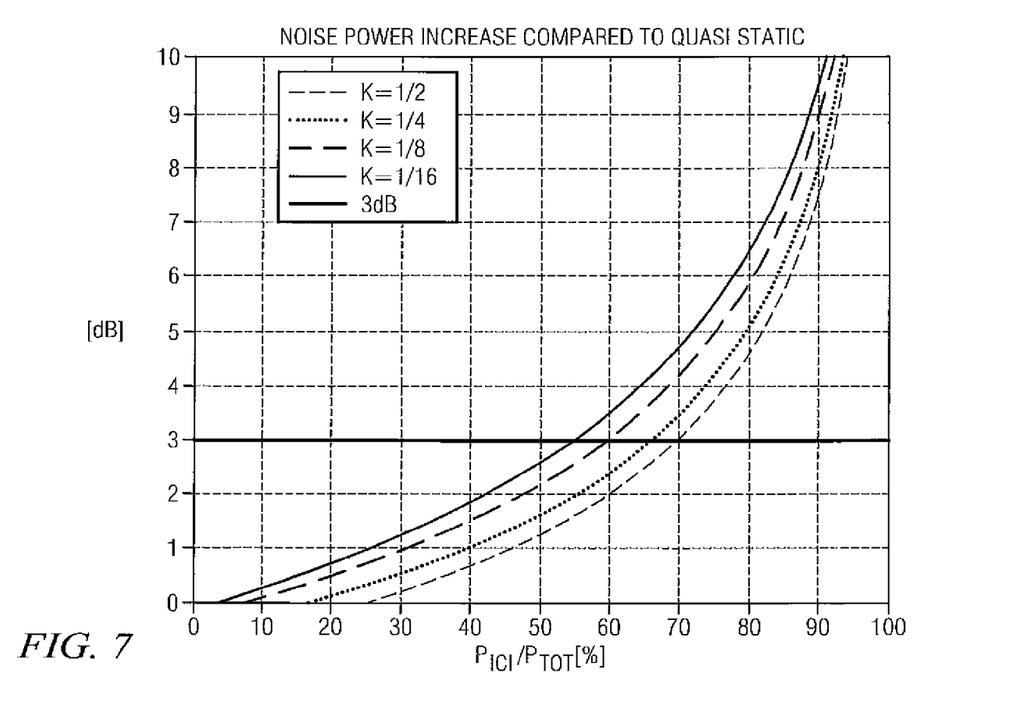
Figure 8:
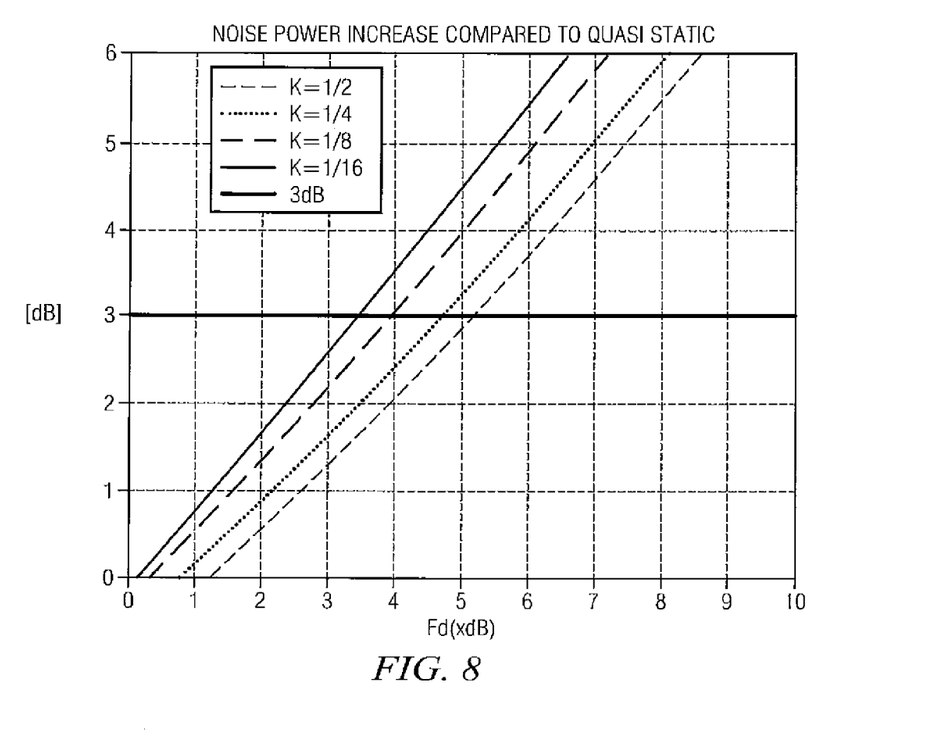

FIG. 6 shows total noise power reduction for different values of K and ICI power fractions. FIG. 6 shows that at the point at which the ICI noise power equals the non-ICI noise power, i.e., $$\frac{\sigma_{ICI,TOT}^2}{\sigma_{TOT}^2} = \frac{\sigma_{non-ICI,TOT}^2}{\sigma_{TOT}^2} = 50\%,$$

the new ICI reduction method has decreased the total noise by 1.4 dB. FIG. 7 shows that using the new ICI reduction method, the fraction of ICI noise to reach Fd(3 dB) is 66% instead of 50%. FIG. 8 shows that the original Fd(3 dB) corresponds to Fd(4.7 dB).

Until now it was assumed that the channel impulse response length was known. However this is not always the case. In the following paragraphs will be shown that when A(n) is computed, the channel impulse response length can be derived from it.

Estimating the Channel Impulse Response Length

One typical operation in a wireless receiver is to estimate, or calculate, the channel impulse response (CIR) length of the communication channel. The result of this calculation can be used to apply appropriate settings in an equaliser at the receiver to compensate for the channel. If the CIR length is estimated, or assumed, too short the possibility exists that extra noise (due to the Inter-Symbol-Interference or ISI) is introduced as already shown in (3).

Considering again the equations in the "Estimation of the A(n)" section:

$$\tilde{A}(n) = \frac{rx(n) - rx(n-N)}{N}$$

$$\cong A(n) - \frac{ISI(n)}{N} + \frac{w'(n)}{N}$$

with:

$$ISI(n) = \sum_{l=1}^{L} (tx(n-N-l) - tx(n-l)) \cdot (h(n,l) - N \cdot a(l))$$

and w'(n)=w(n)−w(n−N)

Figure 9:
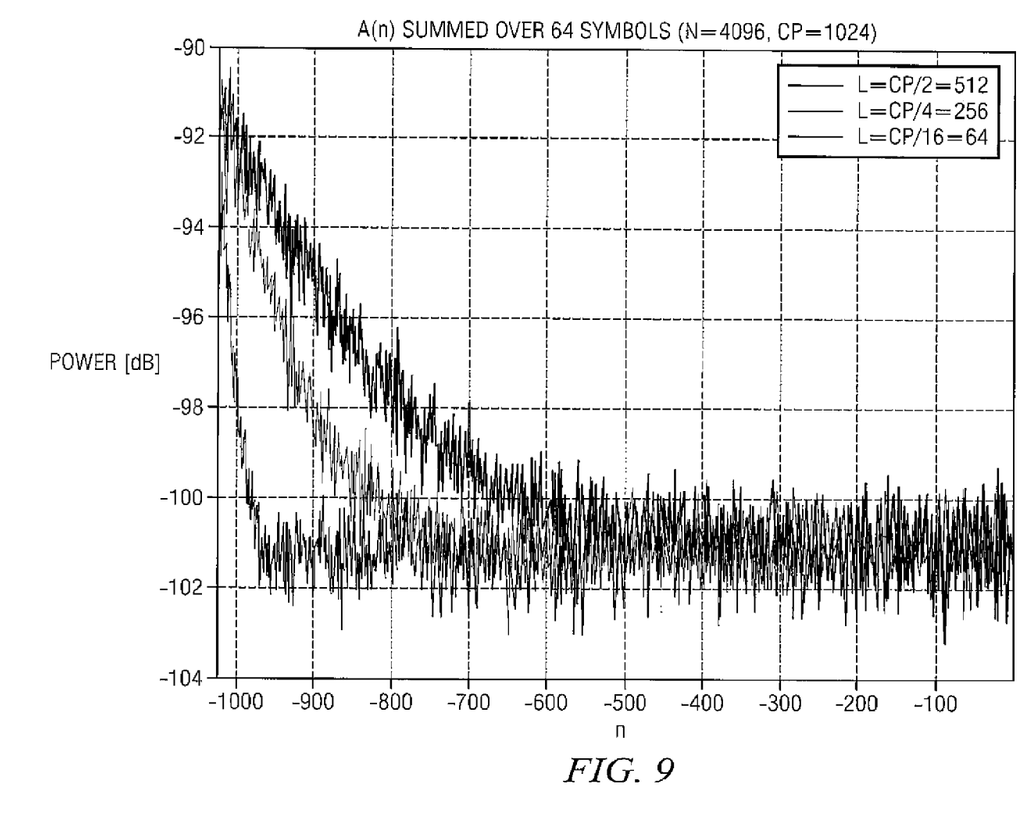
FIG. 9 shows the A(n) estimation for different channel lengths.

The amplitude of the ISI(n) term is approximately proportional to the number of terms in the summation (L), or the power is proportional to (L)². This means that the power of Ã(n) will increase when ISI(n) becomes dominant, meaning when n≤N−G+L−1. This is shown in FIG. 9 for different channel lengths L. If the channel length is not known, the average power of A(n) can be used to estimate it. For example, referring to FIG. 9, A(n) is more or less constant for n close to zero. Example channel length L estimation could be made by assuming a threshold Th which is the maximum of A(n) for n close to 0 (e.g. n=0:−100 in FIG. 9). When n is decreased there will be an instant "n" where almost every A(n) is larger than the threshold. That "n" could be an estimate of the channel length L.

Windowing

Deriving the Optimal Window

In accordance with an aspect of the present invention a windowing function is used and defines the amount of the ICI-estimate that will be used to compensate the received signal rx(n). The idea is to optimize this amount since at some point the estimate will be wrong due to ISI which is much more dominant than ICI (see previous paragraph). It is the correction to be applied that is windowed. This will be done in block 54 of FIG. 10.

This embodiment relates to the same case as described in the previous section. Equation (5) is repeated below for convenience:

$$rx_{reducedICI}(n) \cong$$
$$rx_{noICI}(n) + \left(n - \frac{N-1}{2}\right) \cdot \left(A(n) \cdot (1 - WIN(n)) + \frac{ISI(n)}{N} \cdot WIN(n)\right)$$

Define:

$$\begin{cases} \text{Noise}_{ICI}(n) \cong \left(n - \frac{N-1}{2}\right) \cdot A(n) \\ \text{Noise}_{ISI}(n) = \left(n - \frac{N-1}{2}\right) \cdot \frac{ISI(n)}{N} \end{cases}$$

$$\Rightarrow rx_{reducedICI}(n) \cong$$
$$rx_{noICI}(n) + \text{Noise}_{ICI}(n) \cdot (1 - WIN(n)) + \text{Noise}_{ICI}(n) \cdot WIN(n)$$

It shows that there is a trade-off between removing ICI power and adding ISI power. This trade-off can be optimized by choosing WIN(n) correctly.

The optimum value of WIN(n) can be computed using a Minimum Mean-Square Error (MMSE) calculation as follows:

$$\frac{\partial |\text{Noise}_{ICI}(n) \cdot (1 - WIN(n)) + \text{Noise}_{ISI}(n) \cdot WIN(n)|^2}{\partial WIN(n)} = 0$$

$$\Rightarrow \frac{\partial |\text{Noise}_{ICI}(n)|^2 \cdot (1 - WIN(n))^2 + |\text{Noise}_{ISI}(n)|^2 \cdot WIN^2(n)}{\partial WIN(n)} = 0$$

$$\Rightarrow WIN(n) = \frac{|\text{Noise}_{ICI}(n)|^2}{|\text{Noise}_{ICI}(n)|^2 + |\text{Noise}_{ISI}(n)|^2}$$

$$\boxed{WIN(n) = \frac{|A(n)|^2}{\left(\frac{|ISI(n)|}{N}\right)^2 + |A(n)|^2}}$$

for n=[N−G, N−1]

Simplifying the Window Definition

The requirement stated above can be suboptimal because ISI(n) and A(n) are both unknown and will typically change from symbol to symbol in the received signal.

In accordance with an embodiment of the present invention the equation "in the mean" (over different symbols) can be used:

$$WIN(n) = \frac{E\{|A(n)|^2\}}{\frac{E\{|ISI(n)|^2\}}{N^2} + E\{|A(n)|^2\}}$$

The numerator $E\{|A(n)|^2\}$ can be assumed independent of n, so:

$$E\{|A(n)|^2\} = A^2$$

The denominator can be obtained using the estimation $\tilde{A}(n)$:

$$E\{|\tilde{A}(n)|^2\} \cong E\left\{\left|A(n) - \frac{ISI(n)}{N}\right|^2\right\} \cong E\{A^2(n)\} + \frac{E\{|ISI(n)|^2\}}{N^2}$$

Combining all, results in:

$$WIN(n) = \frac{A^2}{E\{|\tilde{A}(n)|^2\}}$$

Using the constraint that on WIN(n)=1 for n=[N−G+L, N−1] so certainly for n=N−1, WIN(n) can be rewritten, e.g. one can compute the scaling factor $A^2$ as follows:

$$A^2 = WIN(N-1) \cdot E\{|\tilde{A}(N-1)|^2\} = E\{|\tilde{A}(N-1)|^2\}$$

Finally:

$$\boxed{WIN(n) = \frac{E\{|\tilde{A}(N-1)|^2\}}{E\{|\tilde{A}(n)|^2\}}} \quad n = [N-G, \; N-1]$$

The windowing function WIN(n) equals the average power of A(n=N) divided by the average power of A(n). Since A(n) will be computed every symbol (e.g. to cancel ICI) it can be averaged from symbol-to-symbol using for instance a leaky integrator. The windowing function can then be obtained by inverting the averaged A(n)^2, scaled such that WIN(N−1)=1. This has the advantage that the windowing function is hence obtained as a byproduct of the ICI canceling mechanism, and no additional complexity is required.

The more accurate the division is, the higher the performance of the ICI canceling will be. However, if desired, it is possible to further reduce the complexity of this calculation by optionally approximating the division. E.g. approximation example 1: reducing the number of bits in numerator and denominator. Approximation example 2: right-shifting both numerator and denominator until denominator="000001.xxx". The "fractional" value in the numerator represents the division.

Figure 10:
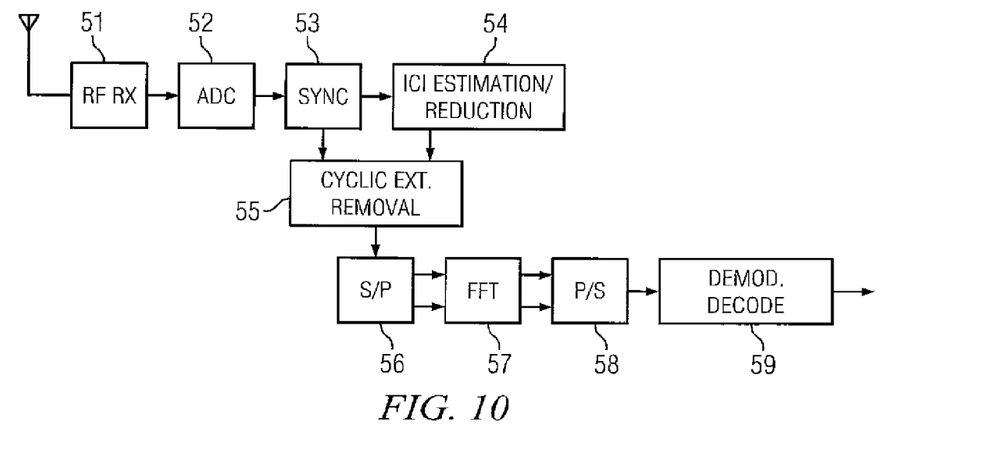
FIG. 10 shows a receiver which can perform the ICI estimation and reduction.

FIG. 10 schematically shows a multi-carrier receiver as an embodiment of the present invention, such as receiver 20 in FIG. 1, for implementing the method described above. An RF signal is received at an RF front-end stage 51. The signal received by stage 51 may be subject to various forms of impairment, such as ICI. Typically the RF signal is downmixed, filtered and digitised by an analog-to-digital conversion stage 52. A timing and frequency synchronisation stage 53 determines parameters for accurate synchronisation of the receiver; these include symbol timing which will allow stage 55 to accurately remove the cyclic extension. An ICI estimation/reduction stage 54 performs the steps of the method described above to estimate the ICI and then remove the ICI from the received signal. The noise-reduced signal is applied to the cyclic extension removal stage 55 where the cyclic extensions are removed from the time-domain signal. The signal is then applied to a serial-to-parallel conversion stage 56 and to a Fast Fourier Transform (FFT) stage where the signal is converted from the time-domain to the frequency-domain. FFT 57 outputs an array of complex numbers, where every complex number represents the complex point that was modulated on one of the carriers. The set array of outputs are applied to a parallel-to-serial conversion stage 58 and to demapping and decoding stages, shown generally as block 59.

Accordingly, the present invention also provides an ICI reduction stage, e.g. for a receiver, having means for estimating inter-carrier interference (ICI) for a received multi-carrier signal in which symbols are separated by a guard interval containing a cyclic extension of a symbol, the ICI reduction stage comprising:

means for estimating inter-carrier interference using the function:

$$\tilde{A}(n) = \frac{rx(n) - rx(n-N)}{N}$$

for n=[N−G, N−1]
where:
rx(n) is the received signal at time n,
rx(n−N) is the received signal at time n-N N is the symbol length (not including the cyclic extension), the means for estimating being adapted to estimate the inter-carrier interference in the time-domain before time-domain-to-frequency processing of the received signal. More preferably the function:

$$ICI_{estimated}(n) = \left(n - \frac{N-1}{2}\right) \cdot \tilde{A}(n)$$

is used for estimating the inter-carrier interference.

The ICI reduction stage is preferably adapted to assume that a variation in the channel is linear during a symbol.

The ICI reduction stage may comprise means for estimating the channel impulse response length by methods described above.

The ICI reduction stage may also be adapted to estimate the ICI as above and to use the estimation of ICI to reduce ICI in the received signal.

The ICI reduction stage may be adapted to use a windowing function which determines an amount of the estimated ICI that is used to compensate the received signal.

The windowing function may equal the average power of A (n=N) divided by the average power of A(n) or may be calculated using the function:

$$WIN(n) = \frac{E\{|\tilde{A}(N-1)|^2\}}{E\{|\tilde{A}(n)|^2\}}$$

for n=[N−G, N−1], where:

$$E\{|\tilde{A}(N-1)|^2\} = E\left\{\left|\frac{rx(N-1) - rx(-1)}{N}\right|^2\right\}$$

$$E\{|\tilde{A}(n)|^2\} \cong E\left\{\left|\frac{rx(n) - rx(n-N)}{N}\right|^2\right\}.$$

The ICI reduction stage may be adapted to calculate the ICI reduction using the function:

$$rx_{ICIreduced}(n) \cong rx(n) - \left(n - \frac{N-1}{2}\right) \cdot \tilde{A}(n) \text{ or}$$

$$rx_{ICIreduced}(n) = rx(n) - \left(n - \frac{N-1}{2}\right) \cdot WIN(n) \cdot \tilde{A}(n)$$

for n=[N−G, N−1] where WIN(n) is the windowing function which determines an amount of the estimated ICI that is used to compensate the received signal.

The multi-carrier signal to be processed by the ICI reduction stage can be an orthogonal frequency division multiplexed (OFDM) or a DMT signal.

The present invention also provides a controller, e.g. for a receiver, having means for estimating inter-carrier interference (ICI) for a received multi-carrier signal in which symbols are separated by a guard interval containing a cyclic extension of a symbol, the controller comprising:

means for estimating inter-carrier interference using the function:

$$\tilde{A}(n) = \frac{rx(n) - rx(n-N)}{N}$$

for n=[N−G, N−1]
where:
rx(n) is the received signal at time n,
rx(n−N) is the received signal at time n-N
N is the symbol length (not including the cyclic extension), the means for estimating being adapted to estimate the inter-carrier interference in the time-domain before time-domain-to-frequency processing of the received signal. More preferably the function:

$$ICI_{estimated}(n) = \left(n - \frac{N-1}{2}\right) \cdot \tilde{A}(n)$$

is used for estimating the inter-carrier interference.

The controller is preferably adapted to assume that a variation in the channel is linear during a symbol.

The controller may comprise means for estimating the channel impulse response length by methods described above.

The controller may also be adapted to estimate the ICI as above and to use the estimation of ICI to reduce ICI in the received signal.

The controller may be adapted to use a windowing function which determines an amount of the estimated ICI that is used to compensate the received signal.

The windowing function may equal the average power of A (n=N) divided by the average power of A(n) or may be calculated using the function:

$$WIN(n) = \frac{E\{|\tilde{A}(N-1)|^2\}}{E\{|\tilde{A}(n)|^2\}}$$

for n=[N−G, N−1], where:

$$E\{|\tilde{A}(N-1)|^2\} = E\left\{\left|\frac{rx(N-1) - rx(-1)}{N}\right|^2\right\}$$

$$E\{|\tilde{A}(n)|^2\} \cong E\left\{\left|\frac{rx(n) - rx(n-N)}{N}\right|^2\right\}.$$

The controller may be adapted to calculate the ICI reduction using a windowing function using the function:

$$rx_{ICIreduced}(n) \cong rx(n) - \left(n - \frac{N-1}{2}\right) \cdot \tilde{A}(n) \text{ or}$$

$$rx_{ICIreduced}(n) = rx(n) - \left(n - \frac{N-1}{2}\right) \cdot WIN(n) \cdot \tilde{A}(n)$$

for n=[N−G, N−1].
where WIN(n) is the windowing function which determines an amount of the estimated ICI that is used to compensate the received signal The multi-carrier signal to be processed by the controller can be an orthogonal frequency division multiplexed (OFDM) or a DMT signal.

The controller may be included in an apparatus such as a receiver or a transceiver.

Any of the functionality described above, including blocks, modules, circuits, and algorithm steps may be implemented as hardware, computer software, or combinations of both. The various illustrative logical blocks, modules, and circuits described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination designed to perform the functions described herein. A general purpose processor may be a microprocessor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The present invention also includes software comprising code which when executed on a computing system estimates inter-carrier interference (ICI) for a received multi-carrier signal in which symbols are separated by a guard interval containing a cyclic extension of a symbol. The software includes code for estimating inter-carrier interference using the functions:

$$\tilde{A}(n) = \frac{rx(n) - rx(n-N)}{N}$$

for n=[N−G, N−1]
where: rx(n) is the received signal at time n,
rx(n−N) is the received signal at time n−N
N is the symbol length (not including the cyclic extension), the estimating of the inter-carrier interference being in the time-domain before time-domain-to-frequency processing of the received signal. More preferably the function $$ICI_{estimated}(n) = \left(n - \frac{N-1}{2}\right) \cdot \tilde{A}(n)$$

is used for estimating the inter-carrier interference.

The software may be based on assuming that a variation in the channel is linear during a symbol.

The software may be adapted to estimate the channel impulse response length by methods described above.

The present invention also includes software comprising code which when executed on a computing system reduces inter-carrier interference (ICI) for a received multi-carrier signal in which symbols are separated by a guard interval containing a cyclic extension of a symbol.

The software may be adapted to perform an estimation of ICI as above followed by using the estimation of ICI to reduce ICI in the received signal.

The software may be adapted to use a windowing function which determines an amount of the estimated ICI that is used to compensate the received signal.

The software may be adapted to calculate the windowing function according to the average power of A (n=N) divided by the average power of A(n). The software may be adapted to calculate the windowing function using the function:

$$WIN(n) = \frac{E\{|\tilde{A}(N-1)|^2\}}{E\{|\tilde{A}(n)|^2\}}$$

for n=[N−G, N−1], where:

$$E\{|\tilde{A}(N-1)|^2\} = E\left\{\left|\frac{rx(N-1) - rx(-1)}{N}\right|^2\right\}$$

$$E\{|\tilde{A}(n)|^2\} \cong E\left\{\left|\frac{rx(n) - rx(n-N)}{N}\right|^2\right\}.$$

The software may be adapted to reduce the ICI by applying:

$$rx_{ICIreduced}(n) \cong rx(n) - \left(n - \frac{N-1}{2}\right) \cdot \tilde{A}(n) \text{ or}$$

$$rx_{ICIreduced}(n) = rx(n) - \left(n - \frac{N-1}{2}\right) \cdot WIN(n) \cdot \tilde{A}(n)$$

for n=[N−G, N−1].
where WIN(n) is any windowing function which determines an amount of the estimated ICI that is used to compensate the received signal.

The software may be stored on any suitable storage medium such as diskette, hard drive, tape drive, solid state memory such as a USB memory stick, optical disk such as a CD-ROM or DVD-ROM are variant of such.

Some practical examples can illustrate the savings possible using the new ICI estimation/reduction method:
1. Wireless LAN or IEEE 802.11a/g/n with: N=64, G=N/4, Fs=20 MHz
    a. ICI reduction with computation $O(N^3)$: 60000 MOPS
    b. ICI reduction with computation $O(N.\log_2(N))$: 96 MOPS
    c. the new ICI reduction method $$O\left(\frac{N}{4}\right):4MOPS$$

2. DVB-H with: N=8192, G-N/4, Fs=8 MHz
    d. ICI reduction with computation $O(N^3)$: 400000000 MOPS
    e. ICI reduction with computation $O(N.\log_2(N))$: 80 MOPS
    f. the new ICI reduction method $$O\left(\frac{N}{4}\right):2MOPS$$

The invention is not limited to the embodiments described herein, which may be modified or varied without departing from the scope of the invention.

What is claimed is:

1. A method of estimating an inter-carrier interference (ICI) for a multi-carrier signal received from a channel, in which signal symbols are separated by a guard interval including a cyclic extension of a symbol, the method comprising:
    estimating the inter-carrier interference by a controller using a function:

$$\tilde{A}(n) = \frac{rx(n) - rx(n-N)}{N}$$

for n=[N−G, N−1],
where:
    rx(n) is the received signal at time n,
    rx(n-N) is the received signal at time n-N,
    N is the symbol length (not including the cyciic extention),
    G is the cyciic extention length;
the estimating of the inter-carrier interference being in a time-domain before time-domain-to-frequency processing of the received multi-carrier signal.

2. The method according to claim 1, wherein the estimated inter-carrier-interference is given by $$ICI_{estimated}(n) = \left(n - \frac{N-1}{2}\right) \cdot \tilde{A}(n)$$

for n=[N−G, N−1],
where: $ICI_{estimated}(n)$ is the estimated inter-carrier interference.

3. A method according to claim 1, further comprising estimating the channel impulse response length.

4. A method of reducing an inter-carrier interference (ICI) for a received multicarrier signal in which symbols are separated by a guard interval including a cyclic extension of a symbol the method comprising:

estimating, by a processing apparatus in a receiver, the inter-carrier interference using a function:

$$\tilde{A}(n) = \frac{rx(n) - rx(n-N)}{N}$$

for n=[N−G, N−1],
where:
rx(n) is the received signal at time n,
rx(n-N) is the received signal at time n-N,
N is the symbol length (not including the cyciic extention),
G is the cyciic extention length;
the estimating of the inter-carrier interference being in a time-domain before time-domain-to-frequency processing of the received multicarrier signal: and using the estimation of ICI to reduce the ICI in the received multicarrier signal.

5. A method according to claim 4 further comprising using a windowing function which determines an amount of the estimated ICI that is used to compensate the received multicarrier signal.

6. A method according to claim 5 wherein the windowing function at least one of (1) equals an average power of A (n=N) divided by the average power of A(n) and (2) is calculated using the function:

$$WIN(n) = \frac{E\{|\tilde{A}(N-1)|^2\}}{E\{|\tilde{A}(n)|^2\}}$$

for n=[N−G, N−1], where:

$$E\{|\tilde{A}(N-1)|^2\} = E\left\{\left|\frac{rx(N-1)-rx(-1)}{N}\right|^2\right\}$$

$$E\{|\tilde{A}(n)|^2\} \cong E\left\{\left|\frac{rx(n)-rx(n-N)}{N}\right|^2\right\}.$$

7. A method according to claim 5 wherein reducing the ICI in the received multicarrier signal is calculated using the function:

$$rx_{ICIreduced}(n) \cong rx(n) - \left(n - \frac{N-1}{2}\right) \cdot \tilde{A}(n) \text{ or}$$

$$rx_{ICIreduced}(n) = rx(n) - \left(n - \frac{N-1}{2}\right) \cdot WIN(n) \cdot \tilde{A}(n)$$

for n=[N−G, N−1],
where WIN(n) is a windowing function which determines an amount of the estimated ICI that is used to compensate the received signal.

8. A method according to claim 6 wherein reducing the ICI in the received multicarrier signal is calculated using the function:

$$rx_{ICIreduced}(n) \cong rx(n) - \left(n - \frac{N-1}{2}\right) \cdot \tilde{A}(n) \text{ or}$$

$$rx_{ICIreduced}(n) = rx(n) - \left(n - \frac{N-1}{2}\right) \cdot WIN(n) \cdot \tilde{A}(n)$$

for n=[N−G, N−1],
where WIN(n) is the windowing function which determines an amount of the estimated ICI that is used to compensate the received signal.

9. A method according to claim 1 wherein the multi-carrier signal is at least a one of an orthogonal frequency division multiplexed (OFDM) signal and a discrete multi-tone (DMT) signal.

10. A system for estimating an inter-carrier interference (ICI) for a received multi-carrier signal in which symbols are separated by a guard interval including a cyclic extension of a symbol, the system comprising:

a receiver, the receiver comprising a controller configured to estimate the inter-carrier interference using a function:

$$\tilde{A}(n) = \frac{rx(n) - rx(n-N)}{N}$$

for n=[N−G, N−1],
where:
rx(n) is the received signal at time n,
rx(n-N) is the received signal at time n-N,
N is the symbol length (not including the cyciic extention),
G is the cyciic extention length;
the receiver being adapted to estimate the inter-carrier interference in a time-domain before time-domain-to-frequency processing of the received multi-carrier signal.

11. The system of claim 10, wherein the receiver uses the following function to estimate the inter-carrier-interference:

$$ICI_{estimated}(n) = \left(n - \frac{N-1}{2}\right) \cdot \tilde{A}(n)$$

for n=[N−G, N−1],
where: $ICI_{estimated}(n)$ is the estimated inter-carrier interference.

12. The system of claim 10, wherein the receiver is further adapted to reduce the ICI according to $$rx_{ICIreduced}(n) \cong rx(n) - \left(n - \frac{N-1}{2}\right) \cdot \tilde{A}(n) \text{ or}$$

$$rx_{ICIreduced}(n) = rx(n) - \left(n - \frac{N-1}{2}\right) \cdot WIN(n) \cdot \tilde{A}(n)$$

for n=[N−G, N−1],
where WIN(n) is a windowing function which determines an amount of the estimated ICI that is used to compensate the received multi-carrier signal.

* * * * *